(12) United States Patent
Ochi (10) Patent No.: US 8,655,503 B2
(45) Date of Patent: Feb. 18, 2014

(54) SHORT RANGE COMMUNICATION APPARATUS

(75) Inventor: Hikaru Ochi, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 13/362,283

(22) Filed: Jan. 31, 2012

(65) Prior Publication Data

US 2012/0203396 A1 Aug. 9, 2012

(30) Foreign Application Priority Data

Feb. 8, 2011 (JP) .................................. 2011-24879

(51) Int. Cl.
*G06F 7/00* (2006.01)

(52) U.S. Cl.
USPC ............................................................. 701/1

(58) Field of Classification Search
None
See application file for complete search history.

(56) References Cited

U.S. PATENT DOCUMENTS

| | | | | |
|---|---|---|---|---|
| 2003/0224793 A1* | 12/2003 | Bonta et al. | .................... | 455/445 |
| 2006/0079182 A1 | 4/2006 | Matsuda | | |
| 2007/0287542 A1* | 12/2007 | Miyazaki et al. | ............... | 463/39 |
| 2008/0280655 A1 | 11/2008 | Ozaki | | |
| 2008/0305787 A1 | 12/2008 | Yamada et al. | | |
| 2010/0070637 A1 | 3/2010 | Saito et al. | | |

FOREIGN PATENT DOCUMENTS

JP 2010-068406 3/2010

OTHER PUBLICATIONS

"Interphone F4 User Manual".*
"Interphone F4 User Manual-available on Feb 2, 2010", document showing an availabilty date of the Interphone F4 User Manual.*

* cited by examiner

*Primary Examiner* — Thomas Tarcza
*Assistant Examiner* — Garrett Evans
(74) *Attorney, Agent, or Firm* — Harness, Dickey & Pierce, PLC (57) ABSTRACT

A control unit performs a forced decoupling of a communication link between a second in-vehicle apparatus and a short range communication unit, and couples a communication link between a first in-vehicle apparatus, and the short range communication unit when the second in-vehicle apparatus has a lower profile priority order than the first in-vehicle apparatus. Additionally, the forced decoupling is performed when, at the time of the communication request by the first in-vehicle apparatus, the short range communication unit was in communication with a maximum "M" number of in-vehicle apparatuses, and the second in-vehicle apparatus had the lowest priority order of the M number of in-vehicle apparatuses. The control unit re-couples the second in-vehicle apparatus when at least one of the M number of in-vehicle apparatuses has completed its profile function ending the communication link.

4 Claims, 4 Drawing Sheets

SHORT RANGE COMMUNICATION APPARATUS

CROSS REFERENCE TO RELATED APPLICATION

The present application is based on and claims the benefit of priority of Japanese Patent Application No. 2011-24879, filed on Feb. 8, 2011, the disclosure of which is incorporated herein by reference.

TECHNICAL FIELD

The present disclosure generally relates to a short range communication apparatus, which can connect a short range communication link to a plurality of in-vehicle apparatuses.

BACKGROUND

Conventionally, as disclosed in Japanese Patent Laid-Open No. 2010-68406 (JP '406), an in-vehicle apparatus may communicably couple to a plurality of portable devices by way of a short range communication link, such as a Bluetooth communication link. By communicating with multiple portable devices at the same time, the in-vehicle apparatus is able to perform various functions, such as a hands-free function between the in-vehicle apparatus and a cellular phone, a music streaming function between the in-vehicle apparatus and an audio player.

Based on JP '406, each of the portable devices sends a communication request to an in-vehicle apparatus in order to establish a short range communication link with the in-vehicle apparatus. However, it is not expected that a plurality of in-vehicle apparatuses may send a connection request to a portable device, such that the portable device is inundated with communication requests from in-vehicle apparatuses with varying profile functions.

SUMMARY

This section provides a general summary of the disclosure, and is not a comprehensive disclosure of its full scope or all of its features.

In an aspect of the present disclosure, a short range communication apparatus may include a short range communication unit, a storage unit, and a control unit. The short range communication unit is communicably coupled to a plurality of in-vehicle apparatuses. The short range communication unit may be communicably coupled by way of a short range communication link, such as Bluetooth communication link. The short range communication unit communicably couples to a maximum "M" number of in-vehicle apparatuses at a time. The storage unit stores a priority order of various profiles. The control unit controls the short range communication link between the short range communication unit and the in-vehicle apparatus according to the priority order stored in the storage unit, When the control unit receives a communication request from a first in-vehicle apparatus, the control unit performs a forced decoupling of a short range communication link between a second in-vehicle apparatus and the short range communication unit. Such forced decoupling is performed, when the short range communication unit is, at the time of the request from the first in-vehicle apparatus, communicably coupled with a M number of in-vehicle apparatuses, including the second in-vehicle apparatus, and when a coupled profile of the second in-vehicle apparatus has a lower priority than a connection-requesting profile of the first in-vehicle apparatus and a coupled profile of each of the M number of in-vehicle apparatuses.

The control unit may also, re-couple a short range communication link between the second in-vehicle apparatus and the short range unit. Such re-coupling is performed after the control unit performed a forced decoupling of the short range communication link between the second in-vehicle apparatus and the short range communication unit, and when at least one of the M number of in-vehicle apparatuses has completed a function of the coupled profile and the control unit ended the short range communication link with the short range communication unit.

Additionally, the control unit is configured to couple a short range communication link between the short range communication unit and the first in-vehicle apparatus, which sent a communication request, when the short range communication unit, at the time of the request, is communicably coupled with a M number of in-vehicle apparatuses each of which have a coupled profile with a higher priority than the connection-requesting profile of the first in-vehicle apparatus, and at least one of the M number in-vehicle apparatuses has completed a function of the coupled profile and ended the short range communication link with the short range communication unit.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Figure 1:
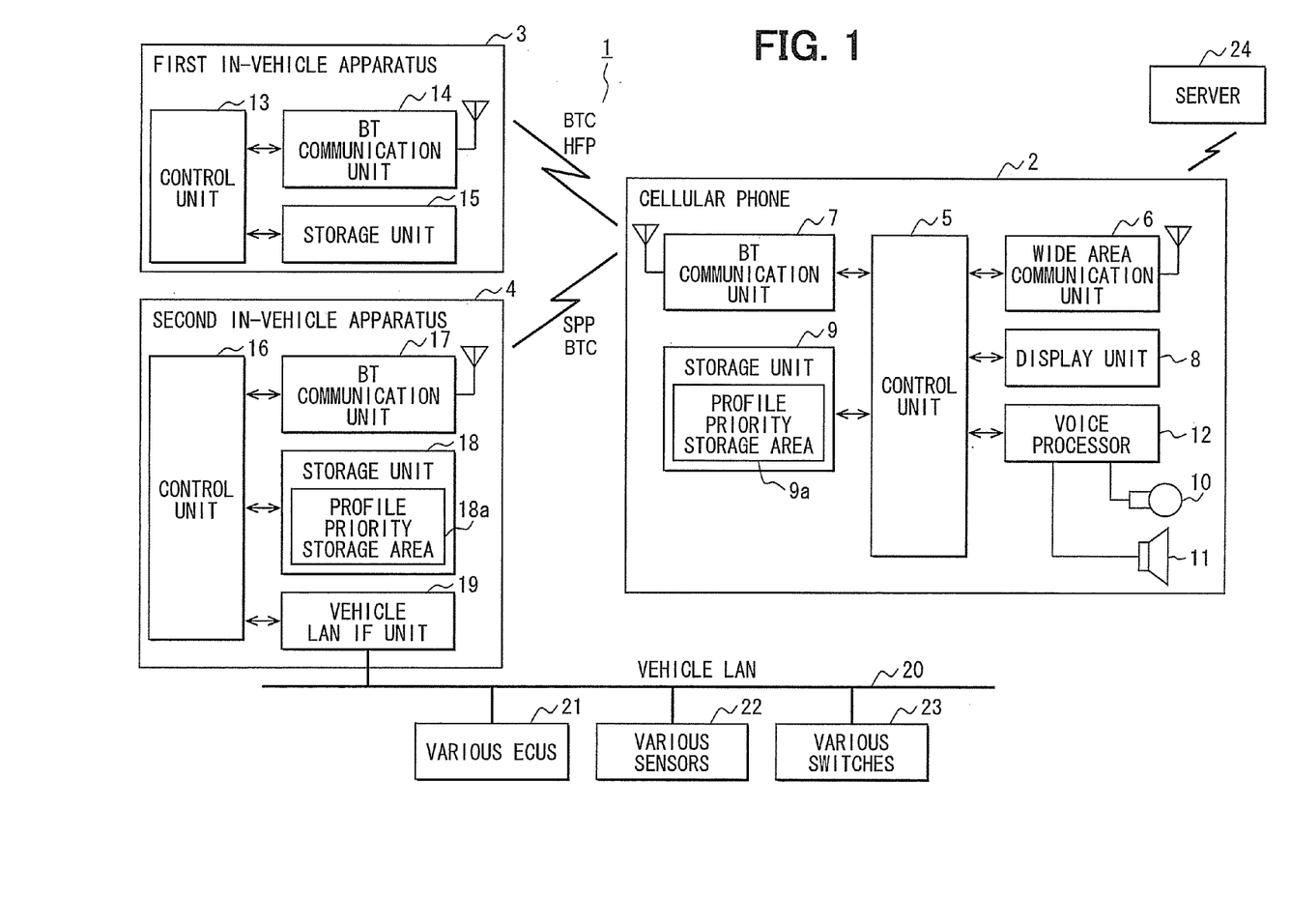
FIG. 1 is a block diagram of a vehicular short range wireless communication system in an embodiment of the present disclosure.

With reference to the drawings, the present disclosure is explained in the following. A system having two in-vehicle apparatuses is used to explain a multi-apparatus system that has a plurality of in-vehicle apparatuses. With reference to FIG. 1, an in-vehicle short range wireless communication system 1 includes a cellular phone 2, a first in-vehicle apparatus 3, and a second in-vehicle apparatus 4, all of which are equipped with a Bluetooth (BT) communication function. The first in-vehicle apparatus 3 and the second in-vehicle apparatus 4 are equipped in a vehicle, and may be referred to as the first and second in-vehicle apparatus 3, 4. The in-vehicle short range wireless communication system 1 is formed when the cellular phone 2 is brought into the vehicle compartment by a user and the cellular phone 2 communicably couples with the first in-vehicle apparatus 3 and the second in-vehicle apparatus 4.

The cellular phone 2 includes a control unit 5 that has a microcomputer as its main component, a wide area communication unit 6, a BT communication unit 7, a display unit 8, and a storage unit 9. The wide area communication unit 6 performs a wide area communication with stations through a cellular phone network. The BT communication unit 7 (i.e., a short range communication unit in claims) performs a BT communication with each of the first and second in-vehicle apparatus 3, 4 in the vehicle. The display unit 8 displays various information screens to a user, such as a wait screen, a call notification screen, a telephone book data list screen, and the like. The storage unit 9 stores data, such as telephone book data, outbound call history data, inbound call history data, and the like. The cellular phone 2 further includes a voice processor that processes sound data from a microphone 10 as a transmitting sound and processes sound data that is outputted to a speaker 11 as a receiving sound.

The cellular phone 2 may communicably couple with the first in-vehicle apparatus 3 or the second in-vehicle apparatus 4. Specifically, the BT communication unit 7 establishes a BT communication link (i.e., a short range communication link) with the first in-vehicle apparatus 3 or the second in-vehicle apparatus 4. The BT communication unit 7 has a setting of a maximum connectable number of BT communication links being configured to "1," and thus cannot establish a BT communication link to the second in-vehicle apparatus 4 when a BT communication link is established between the BT communication unit 7 and the first in-vehicle apparatus 3 (i.e. the cellular phone 2 is already communicably coupled with the first in-vehicle apparatus 3). Accordingly, the BT communication unit 7 can not establish a BT communication link to the first in-vehicle apparatus 3 when a BT communication link is established between the BT communication unit 7 and the second in-vehicle apparatus 4 (i.e. the cellular phone 2 is already communicably coupled with the second in-vehicle apparatus 4). In other words, the BT communication unit 7 selectively performs a BT communication link coupling with either the first in-vehicle apparatus 3 or the second in-vehicle apparatus 4. It should be understood to one skilled in the art that the maximum connectable number of BT communication link may be larger than 1. Additionally the maximum connectable number of BT communication link is referred to as "a maximum "M" number of in-vehicle apparatuses" in the claims.

Besides the data storage area that stores the telephone book data, the outbound call history data and the inbound call history data, the storage unit 9 also has a profile priority storage area 9a that stores the priority order of various profiles that are defined in a BT communication standard. By way of example, the storage unit 9 stores the priority order of the hands-free profile (HFP) to realize a hands-free call as "1" (i.e., a high profile priority order), and the priority order of the serial port profile (SPP) to realize data communication as "2" (i.e., a low profile priority order).

The first in-vehicle apparatus 3 includes a control unit 13 that has a microcomputer as its main component, a BT communication unit 14 that performs a BT communication (BTC) with the cellular phone 2, and a storage unit 15 memorizing various data. The first in-vehicle apparatus 3 may be a navigation apparatus that has the hands-free function that enables a hands-free call (i.e., a call with a microphone and a speaker arranged in a vehicle compartment) when a hands-free profile is coupled to the cellular phone 2. The navigation apparatus also provides well-known navigation functions, such as, identifying a position of the vehicle, setting a destination, searching for a route from the current position of the vehicle to the destination, providing guidance of a searched route, providing an image of the current position of the vehicle with a map on a display unit.

When the control unit 13 of the first in-vehicle apparatus 3 initiates a start-up process of the first in-vehicle apparatus 3, the control unit 13 controls the BT communication unit 14 to search for a portable device, such as, the cellular phone 2, in a BT communication range as a registered object of the BT communication. When the cellular phone 2, which is registered as an object of the BT communication, is in the vehicle compartment, and the cellular phone 2 is within the BT communication range, the control unit 13 couples a hands-free profile by establishing a BT communication link between the BT communication unit 14 and the BT communication unit 7 of the cellular phone 2, on condition that a BT communication link is not established between the cellular phone 2 and the second in-vehicle apparatus 4. That is when the first in-vehicle apparatus 3 is started, a voice transmission between the first in-vehicle apparatus 3 and the cellular phone 2 is enabled and a hands-free call is established (i.e., placing an outbound call or receiving an inbound call as a hands-free call is enabled), when the cellular phone 2 is within the BT communication range and a BT communication link is not established between the cellular phone 2 and the second in-vehicle apparatus 4 (i.e. the cellular phone and the second in-vehicle apparatus 4 are not communicably coupled), at a time of such starting of the first in-vehicle apparatus 3.

The second in-vehicle apparatus 4 includes a control unit 16 that has a microcomputer as its main components, a BT communication unit 17 that performs BT communication with the cellular phone 2, a storage unit 18 that stores various kinds of data, and a vehicle LAN interface (IF) unit 19 having a communication function to communicate with a vehicle LAN 20 in the vehicle, together with other parts. The second in-vehicle apparatus 4 is connected to various ECUs 21 (e.g., an engine ECU, a body ECU, and the like), to various sensors 22 (e.g., an acceleration sensor, a range sensor, and the like), and to various switches 23 (e.g., an ignition switch) through the vehicle LAN 20. The second in-vehicle apparatus 4 transmits various vehicle data, such as a change of the number of engine rotation, a change of the acceleration, an ON-OFF state of the ignition switch, and the like, which are outputted from the ECUs 21, the sensors 22, and the switches 23, to a server 24 through a wide area communication network from the cellular phone 2. In addition, the storage unit 18 has a profile priority storage area 18a for storing the priority of a profile defined in a BT communication standard just like the storage unit 9a of the cellular phone 2. The storage unit 18 memorizes the priority of the hands-free profile to realize a hands-free call as "1," and memorizes the priority of the serial port profile to realize data communication as "2."

When the control unit 16 initiates a start-up process of the second in-vehicle apparatus 4, similarly to the control unit 13 of the first in-vehicle apparatus 3, the control unit 16 controls the BT communication unit 17 to search for the cellular phone 2 in the BT communication range as a registered object of the BT communication. When the cellular phone 2 is brought in the vehicle compartment, and the cellular phone 2 is within the BT communication range at a time of such search of the cellular phone 2, the control unit 13 couples a serial port profile by establishing a BT communication link between the BT communication unit 17 and the BT communication unit 7 of the cellular phone 2 (i.e. the control unit 16 communicably couples the cellular phone 2 and the second in-vehicle apparatus 4), on condition that a BT communication link is not established between the cellular phone 2 and the first in-vehicle apparatus 3. That is, in other words, when the second in-vehicle apparatus 4 is started, data communication between the second in-vehicle apparatus 4 and the cellular phone 2 is enabled when the cellular phone 2 is within the BT communication range and the cellular phone 2 and the first in-vehicle apparatus 3 are not communicably coupled by way of a BT communication link at a time of such starting of the second in-vehicle apparatus 4.

Figure 2:
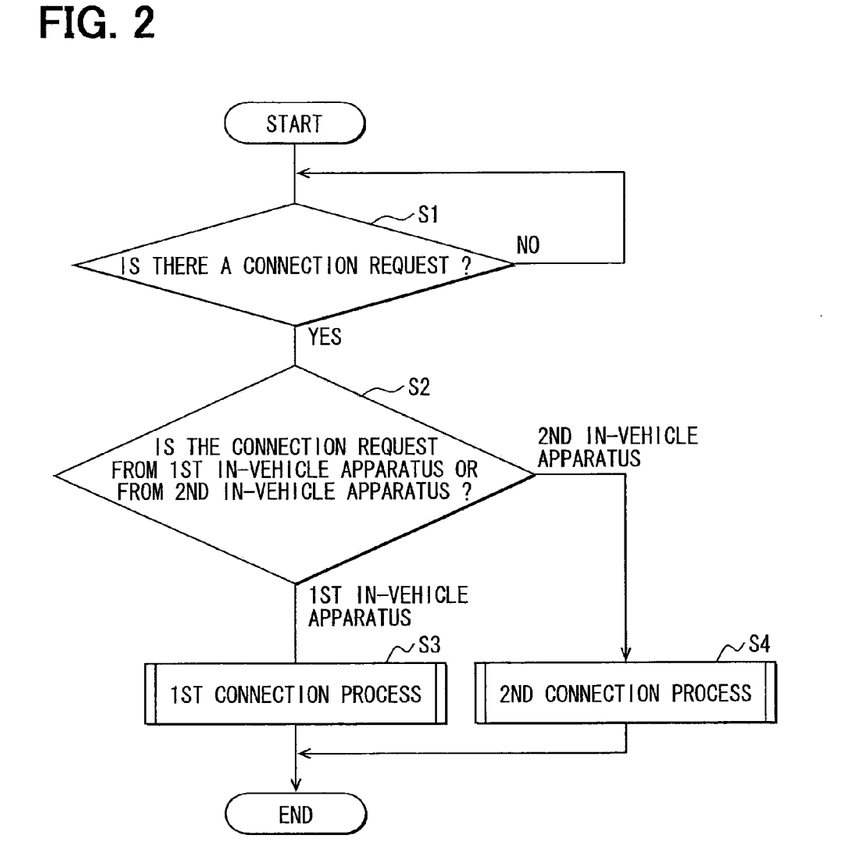
FIG. 2 is a flowchart of a process in a cellular phone in the embodiment.

With reference now to FIG. 2, the control unit 5 of the cellular phone 2 determines whether a communication request notice has been received (S1). Specifically, the control unit 5 monitors the BT communication unit 7 of the cellular phone 2 to determine whether the BT communication unit 7 has received a BT communication link request (a "BT Link" in FIGs) from either the BT communication unit 14 of the first in-vehicle apparatus 3 or the BT communication unit 17 of the second in-vehicle apparatus 4.

When the control unit 5 determines that the BT communication unit 7 has received a connection request notice (S1: YES), the control unit 5 determines whether the connection request notice was sent by the BT communication unit 14 of the first in-vehicle apparatus 3 or the BT communication unit 17 of the second in-vehicle apparatus 4 (S2). Specifically, the control unit 5 analyzes the received connection request notice to determine whether the first in-vehicle apparatus 3 sent the request or whether the second in-vehicle apparatus 4 sent the request. When the control unit 5 determines that the first in-vehicle apparatus 3 sent the connection request (S2: $1^{st}$ in-vehicle apparatus), the control unit 5 executes a first connection process (S3). On the other hand, when the control unit 5 determines that the second in-vehicle apparatus 4 sent the connection request (S2: $2^{nd}$ in-vehicle apparatus), the control unit 5 executes a second connection process (S4). Accordingly, the control unit 3 executes the first connection process when the connection request is from an apparatus that has a high profile priority order and executes the second connection process when connection request is from an apparatus that has a low profile priority order. The first and second connection processes are explained in the following in order.

Figure 3:
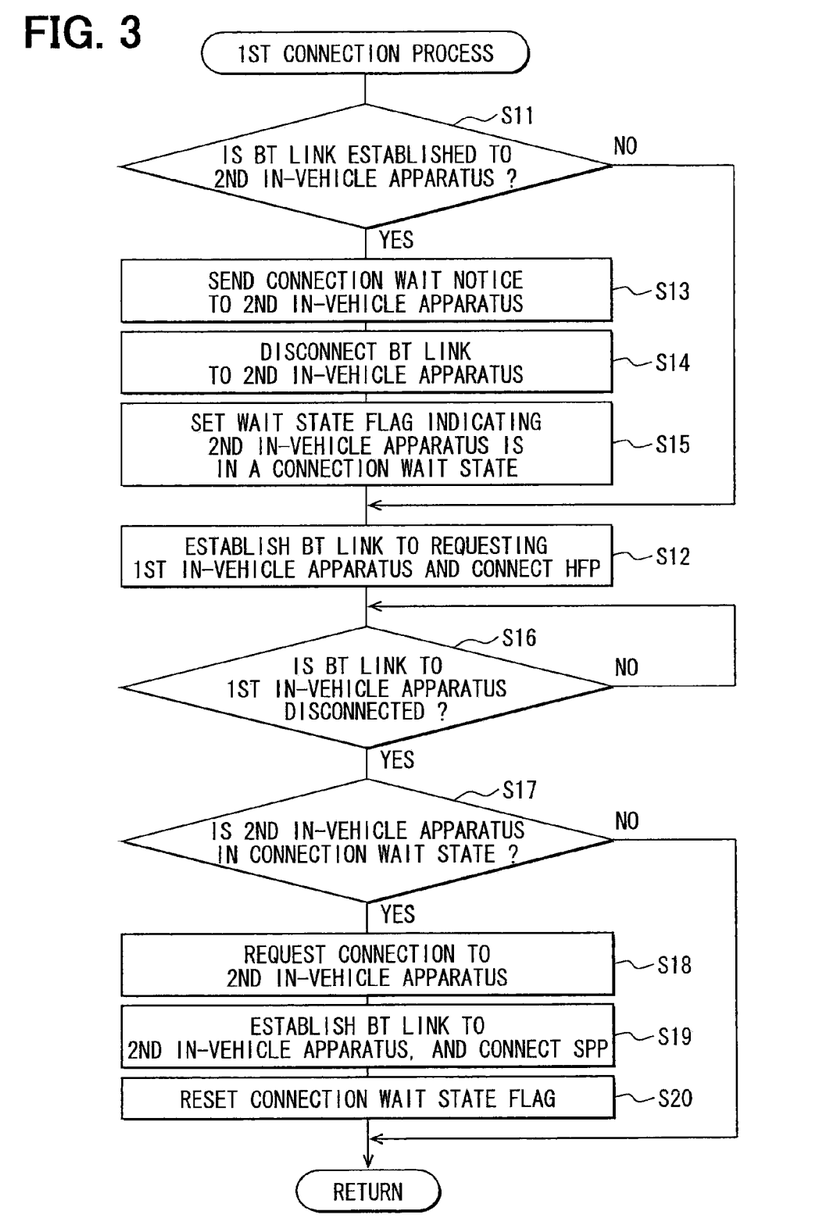
FIG. 3 is a flowchart of a first connection process in FIG. 2.

With reference to FIG. 3, in regards to the first connection process the control unit 5 determines whether a BT communication link is established or is being established between the BT communication unit 7 of the cellular phone 2 and the BT communication unit 17 of the second in-vehicle apparatus 4 (S11). When the control unit 5 determines, at the time of receiving the request from the first in-vehicle apparatus 3, that a BT communication link between the BT communication unit 7 and the BT communication unit 17 of the second in-vehicle apparatus 4 is not established (S11: NO), the control unit 5 establishes a BT communication link between the BT communication unit 7 and the BT communication unit 14 of the first in-vehicle apparatus 3, to couple a hands-free profile (S12).

When the control unit 5 determines, at the time of receiving the request from the first in-vehicle apparatus 3, that a BT communication link between the BT communication unit 7 and the BT communication unit 17 of the second in-vehicle apparatus 4 is established (S11: YES), the control unit 5 controls the BT communication unit 7 to transmit a connection wait notice to the second in-vehicle apparatus 4 (S13). Upon receiving such notice from the BT communication unit 7 of the cellular phone 2 by the BT communication unit 17, the second in-vehicle apparatus 4 transitions to a BT communication link connection wait state.

Subsequently, the control unit 5 performs a forced disconnection of the BT communication link between the BT communication unit 7 and the BT communication unit 17 of the second in-vehicle apparatus 4 regardless of a data communication condition (i.e., without waiting for an end of a profile function) (S14), and sets a wait state flag that indicates that the second in-vehicle apparatus 4 is in a connection wait state (S15). The wait state flag may be provided by storing in a memory location that the second in vehicle apparatus 4 is in a connection wait state. The control unit 5 then establishes a BT communication link between the BT communication unit 7 and the connection-requesting BT communication unit 14 of the first in-vehicle apparatus 3, to couple a hands-free profile (S12).

After establishing a BT communication link between the BT communication unit 7 and the BT communication unit 14 of the first in-vehicle apparatus 3, the control unit 5 subsequently monitors whether a BT communication link between the BT communication unit 7 and the BT communication unit 14 of the first in-vehicle apparatus 3 is disconnected according to an end of a profile function of the hands-free profile (step S16). When it is determined that a BT communication link between the BT communication unit 7 and the BT communication unit 14 of the first in-vehicle apparatus 3 is disconnected according to an end of a profile function of the hands-free profile (S16: YES), the control unit 5 determines whether the second in-vehicle apparatus 4 is in a connection wait state (i.e., whether the wait state flag is set or not) (S17).

When the control unit 5 determines that the second in-vehicle apparatus 4 is not in a connection wait state (S17: NO), the first connection process is finished, to return to the parent process of FIG. 2. When the second in-vehicle apparatus 4 is determined to be in a connection wait state (S17: YES), the control unit 5 controls the BT communication unit 7 to send a connection request notice to the second in-vehicle apparatus 4 (S18) in order to re-connect a BT communication link between the BT communication unit 7 and the BT communication unit 17 of the second in-vehicle apparatus 4. Thereby re-coupling a serial port profile (S19). The control unit 5 resets the wait state flag to indicate that the second in-vehicle apparatus 4 is not in a connection wait state (S20) (i.e. the memory location is cleared), the first connection process is finished, and control unit 5 returns to the parent process.

In other words, when a connection request is generated by the first in-vehicle apparatus 3 that has a high profile priority order, the control unit 5 accepts a connection request from the first in-vehicle apparatus 3. Accordingly, the control unit 5 disconnects a BT communication link that is established or is being established to the second in-vehicle apparatus 4, regardless of a data communication condition, and then establishes a BT communication link to the first in-vehicle apparatus 3 to couple a hands-free profile. Therefore the control unit 5 prioritizes the function of the hands-free profile than the function of the serial port profile. After disconnecting a BT communication link to the first in-vehicle apparatus 3 according to an end of the function of the hands-free profile, the control unit 5 re-connects a BT communication link to the second in-vehicle apparatus 4, which was forcedly disconnected, to re-coupled a serial port profile.

Figure 4:
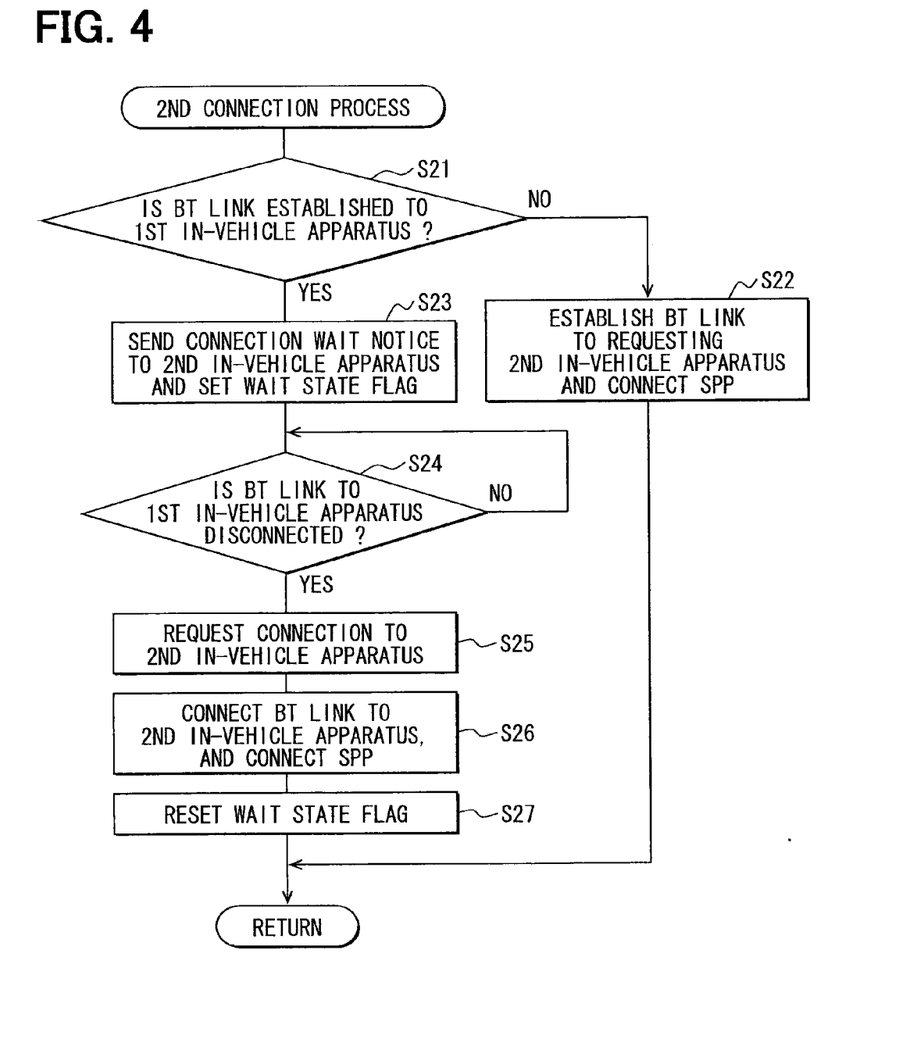
FIG. 4 is a flowchart of a second connection process in FIG. 2.

With reference now to FIG. 4, in regards to the second connection process, the control unit 5 determines whether a BT communication link is established or is being established between the BT communication unit 7 and the BT communication unit 14 of the first in-vehicle apparatus 3 (S21). When the control unit 5 determines, at such time of receiving the connection request from the second in-vehicle apparatus 4, that a BT communication link is not established between the BT communication unit 7 and the BT communication unit 14 of the first in-vehicle apparatus 3 (S21: NO), a BT communication link between the BT communication unit 7 and the BT communication unit 17 of the second in-vehicle apparatus 4 is established, to couple a serial port profile (S22), and then the control unit 5 returns to the parent process.

If it is determined that a BT communication link is established or is being established between the BT communication unit 7 and the second in-vehicle apparatus 4 of the first in-vehicle apparatus 3 (S21: YES), the control unit 5 controls the BT communication unit 7 to send a connection wait notice to the second in-vehicle apparatus 4 and sets the wait state flag (S23). Upon receiving such notice from the BT communication unit 7 of the cellular phone 2 by the BT communication unit 17, the second in-vehicle apparatus 4 transitions to a BT communication link connection wait state.

Subsequently, the control unit 5 determines (i.e., monitors) whether the BT communication link between the BT communication unit 7 and the BT communication unit 14 of the first in-vehicle apparatus 3 is disconnected according to an end of a profile function of the hands-free profile (S24). When it is determined that the BT communication link is disconnected, according to an end of a profile function of the hands-free profile (S24: YES), the control unit 5 controls the BT communication unit 7 to send a connection request notice to the second in-vehicle apparatus 4 (S25) and to establish a BT communication link between the BT communication unit 7 and the BT communication unit 17 of the second in-vehicle apparatus 4, and to couple a serial port profile (S26). The control unit 5 then resets that the wait state flag and returns to the parent process.

In other words, when a connection request is generated by the second in-vehicle apparatus 3 that has a low profile priority order while the cellular phone 2 is communicably coupled to the first in-vehicle apparatus 3, which has a high profile priority order, by way of a BT communication link, the control unit 5 of the cellular phone 5 maintains the BT communication link to the first in-vehicle apparatus 3 (i.e., without disconnecting a link to the first in-vehicle apparatus 3), to prioritize the function of the hands-free profile over the function of the serial port profile. Further, when the control unit 5 disconnects the BT communication link to the first in-vehicle apparatus 3 according to an end of the function of the hands-free profile, the control unit 5 accepts a connection request from the second in-vehicle apparatus 4, and establishes a BT communication link to the second in-vehicle apparatus 4, in order to connect a serial port profile.

The description in the above explains a situation where the maximum connectable number is set to "1." However, the operation of the system is similar when the maximum connectable number is set to "2" or more. That is, if the maximum connectable number is set to "3," and the cellular phone 2 has simultaneously established a BT communication link to the first and second in-vehicle apparatus 3, 4, and, also, to a third in-vehicle apparatus (not shown), a newly-generated connection request from a fourth in-vehicle apparatus (not shown) may be accepted. Specifically, the cellular phone 2 may establish a BT communication link connection with the fourth in-vehicle apparatus by forcedly disconnecting a BT communication link of a profile that has the lowest priority and the profile of the fourth in-vehicle apparatus is higher than the lowest priority profile.

According to the present embodiment described above, when the cellular phone 2 has established a BT communication link to the second in-vehicle apparatus 4 of a low profile priority when a connection request from the first in-vehicle apparatus 3 of a high profile priority is generated, the BT communication link to the second in-vehicle apparatus 4 is forcedly disconnected regardless of the data communication condition, to establish a BT communication link to the first in-vehicle apparatus 3 (i.e. to couple the hands-free profile). On the other hand, when the cellular phone 2 has a BT communication link connection to the first in-vehicle apparatus 3 of a high profile priority, and a connection request from the second in-vehicle apparatus 4 of a low profile priority is generated, the BT communication link to the first in-vehicle apparatus 3 continues till an end of the profile function of the hands-free profile is detected. Once, the BT communication link is disconnected at the end of the profile function, a BT communication link is established between the second in-vehicle apparatus 4 to connect a serial port profile of the cellular phone 2. Therefore, a desired function of a connection-requesting in-vehicle apparatus will be realized without a rejection to a connection request of a BT communication link.

Further, by forcibly disconnecting a BT communication link to the second in-vehicle apparatus 4, regardless of the data communication condition, in order to establish a BT communication link to the first in-vehicle apparatus 3 to couple the hands-free profile, and then disconnecting a BT communication link to the first in-vehicle apparatus 3 according to an end of the profile function of the hands-free profile, the cellular phone 2 re-connects a forcedly-disconnected BT communication link to the second in-vehicle apparatus 4 to re-couple a serial port profile. Therefore, a communication condition of a BT communication link is returned to a state before the first in-vehicle apparatus 3 generated a connection request of a BT communication link.

In general a short range communication unit is coupled to a maximum number of in-vehicle apparatuses, and receives a connection request from a connection-requesting in-vehicle apparatus. Based on a profile priority order stored in a storage unit, the control unit compares the priority of the profile of the connection requesting in-vehicle apparatus with the priority of the profiles of each of the in-vehicle apparatuses that the short range communication unit is coupled to. When the priority of the connection-requesting in-vehicle apparatus is higher than at least one of the in-vehicle apparatuses that the short range communication unit is coupled to, the control unit forcedly disconnects the short range communication link with the in-vehicle apparatus with the lowest priority, in order to establish a short range communication link with the connection-requesting in-vehicle apparatus.

When the control unit determines that the priority of the profile of the connection-requesting in-vehicle apparatus is lower than the priority of each of the in-vehicle apparatuses, which the short range communication unit is coupled to, the control unit establishes a short range communication link with the connection-requesting in-vehicle apparatus, after one of the in-vehicle apparatuses that was coupled to the control unit has completed its profile function, and the control unit disconnects the short range communication link.

Therefore, even when a short range communication link is established to a maximum number of in-vehicle apparatuses, at a time when an in-vehicle apparatus sends a connection request, if the control unit determines that the priority order of the profile to be coupled to the connection-requesting in-vehicle apparatus is higher than at least one of the profiles of the in-vehicle apparatuses that are already coupled to the short range communication unit, the control unit establishes, in a prioritized manner, the short range communication link between the short range communication unit and the connection-requesting in-vehicle apparatus to perform a prioritized connection of a profile. Such prioritized connection is performed after a forced disconnection of one of the short range communication links established to the short range communication unit that has a lower priority than the connection-requesting in-vehicle apparatus and the remaining in-vehicle apparatuses that are coupled to the control unit at the time the request was received by the control unit.

Additionally, when the priority of the profile to be coupled to the connection-requesting in-vehicle apparatus is lower than the priority of all the profiles already coupled to the short range communication unit, by performing a disconnection of one of the short range communication links according to an end of a profile function and by establishing the short range communication link to the connection-requesting in-vehicle apparatus to couple a profile, a desired function of the connection-requesting in-vehicle apparatus that sends the connection request to establish a short range communication link is realized without rejecting such connection request.

In the above configuration, when the control unit finds that the priority order of the profile to be coupled to the connection-requesting in-vehicle apparatus is higher than the profiles already coupled to the short range communication unit, the control unit (i) establishes the short range communication link between the short range communication unit and the connection-requesting in-vehicle apparatus to couple a profile, after performing a forced disconnection of one of the short range communication links that has the lowest priority without waiting for an end of a profile function, and re-establishes the short range communication link between the forcedly-disconnected in-vehicle apparatus and the short range communication unit after disconnecting a short range communication link of an in-vehicle apparatus that has completed its profile function.

In the above-described manner, when the control unit determines that the priority of the profile to be coupled to the connection-requesting in-vehicle apparatus is higher than the priority of a profile that is already coupled, by forcedly disconnecting one of the short range communication links and by establishing, in a prioritized manner, the short range communication link to the connection-requesting in-vehicle apparatus to perform a prioritized connection of a profile, and, after disconnecting a short range communication link between a in-vehicle apparatus that has completed its profile function, the short range communication link is re-established between a forcedly-disconnected in-vehicle apparatus and the short range communication unit to re-couple a profile, thus returning a connection state of the short range communication link to a state before the generation of a connection request.

Although the present disclosure has been fully described in connection with preferred embodiment thereof with reference to the accompanying drawings, it is to be noted that various changes and modifications will become apparent to those skilled in the art.

For example, when the priority of the profile to be coupled to the connection-requesting in-vehicle apparatus is the same as the priority of all the profiles already coupled to the short range communication unit, the control unit performs the same connection process as if the connection-requesting in-vehicle apparatus has a lower priority than all of the profiles already coupled.

The short range communication apparatus is considered to be within a scope of the present disclosure as long as the apparatus is capable of connecting a BT communication link to each of the multiple in-vehicle apparatuses. That is, the short range communication apparatus may be a portable information terminal (i.e., a device that does not have a wide area communication function) or the like.

The cellular phone 2 and each of the first in-vehicle apparatus 3 and the second in-vehicle apparatus 4 may be connected through a wireless connection of a wireless LAN other than a BT communication, or may be connected through a wired connection.

The in-vehicle apparatus may be a device installed in a vehicle at the time of shipment from the factory, or may be a device which is installable in a vehicle after shipment from the factory.

A profile may be other profiles, and any kind of method may be used to determine the priority of profiles. For example, if a hands-free profile and a phone book access profile (PBAP) are connected, the priority of the hands-free profile is set to have a high priority order and the priority of the phone book access profile is set to have a low priority order, for the purpose of prioritizing the function of the hands-free profile over the function of the phone book access profile.

Such changes, modifications, and summarized schemes are to be understood as being within the scope of the present disclosure as defined by appended claims.

What is claimed is:

1. A short range communication apparatus communicating with a plurality of in-vehicle apparatus disposed in a vehicle, the short range communication apparatus comprising:
a computer processor:
a short range communication unit configured to establish a short range communication link with each of the in-vehicle apparatuses, the short range communication unit capable of being actively linked to at most "M" number of in-vehicle apparatuses at a time;
a storage unit configured to store a pre-specified priority order of various different connection profiles; and
a control unit configured to control the short range communication links between the short range communication unit and the in-vehicle apparatuses according to the pre-specified priority order of the connection profiles stored in the storage unit, wherein
when the short range communication unit is actively linked to M in-vehicle apparatuses and the control unit receives a communication request from a first in-vehicle apparatus, which is not actively linked to the short range communication unit, the control unit performs a forced decoupling of the short range communication unit from a second in-vehicle apparatus, which is one of the M in-vehicle apparatuses coupled to the short range communication unit, such that based on the pre-specified priority order of the connection profiles, the second in-vehicle apparatus has a connection profile that is lower than a connection profile of the first in-vehicle apparatus.

2. The short range communication apparatus of claim 1, wherein, the control unit is configured to re-couple a second short range communication link between the second in-vehicle apparatus and the short range communication unit after the control unit performed the forced decoupling of the first short range communication link between the second in-vehicle apparatus and the short range communication unit, and when at least one of the M number of in-vehicle apparatuses having a current active link to the short range communication unit has completed a function of the coupled profile and the control unit ended the current active link with the short range communication unit.

3. The short range communication apparatus of claim 1, wherein the control unit is configured to establish a second short range communication link between the short range communication unit and the first in-vehicle apparatus, which requests the connection, when the short range communication unit, at the time of the request, has an active link with each of the M number of in-vehicle apparatuses each of which have a coupled profile with a higher priority than the connection-requesting profile of the first in-vehicle apparatus, and when at least one of the M number of in-vehicle apparatuses has completed a function of the coupled profile and ended the active link with the short range communication unit.

4. The short range communication apparatus of claim 1, wherein the connection profile of the second in-vehicle apparatus is lower than a connection profile of a third in-vehicle apparatus that is actively linked to the short range communication unit.

* * * * *